(12) United States Patent
Williams et al.

(10) Patent No.: US 11,196,540 B2
(45) Date of Patent: Dec. 7, 2021

(54) END-TO-END SECURE OPERATIONS FROM A NATURAL LANGUAGE EXPRESSION

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 124 days.

(21) Appl. No.: 15/875,933

(22) Filed: Jan. 19, 2018

(65) Prior Publication Data
US 2018/0212752 A1    Jul. 26, 2018

Related U.S. Application Data

(60) Provisional application No. 62/448,890, filed on Jan. 20, 2017, provisional application No. 62/448,918, (Continued)

(51) Int. Cl.
*H04L 9/00* (2006.01)
*G06F 17/30* (2006.01)
(Continued)

(52) U.S. Cl.
CPC ............ *H04L 9/008* (2013.01); *G06F 16/254* (2019.01); *G06F 16/3344* (2019.01);
(Continued)

(58) Field of Classification Search
CPC ..... H04L 9/008; H04L 9/0643; H04L 9/0861; H04L 9/14; H04L 9/30; H04L 9/302;
(Continued)

(56) References Cited

U.S. PATENT DOCUMENTS

| 5,732,390 A | 3/1998 | Katayanagi et al. |
| 6,178,435 B1 | 1/2001 | Schmookler |

(Continued)

FOREIGN PATENT DOCUMENTS

| EP | 2873186 B1 | 3/2018 |
| JP | 5680007 B2 | 3/2015 |

(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.
(Continued)

*Primary Examiner* — Yonas A Bayou
(74) *Attorney, Agent, or Firm* — Carr & Ferrell LLP

(57) ABSTRACT

Systems and methods for an end-to-end secure operation from an expression in natural language. Exemplary methods include: receiving a set of queries from a natural language processor, the set of queries being produced by a method including: getting data schemas associated with a target data source; obtaining the expression in natural language; performing natural language processing on the expression to determine a desired operation; and generating the set of queries using at least one of matching and inference techniques over the desired operation with respect to the data schemas; encrypting the set of queries using a homomorphic encryption technique; providing the encrypted set of queries to a server, the server including the target data source; acquiring encrypted results, the encrypted results being responsive to the encrypted set of queries; and decrypting the encrypted results using a decryption key to produce desired results.

20 Claims, 5 Drawing Sheets

Related U.S. Application Data filed on Jan. 20, 2017, provisional application No. 62/448,893, filed on Jan. 20, 2017, provisional application No. 62/448,906, filed on Jan. 20, 2017, provisional application No. 62/448,908, filed on Jan. 20, 2017, provisional application No. 62/448,913, filed on Jan. 20, 2017, provisional application No. 62/448,916, filed on Jan. 20, 2017, provisional application No. 62/448,883, filed on Jan. 20, 2017, provisional application No. 62/448,885, filed on Jan. 20, 2017, provisional application No. 62/448,902, filed on Jan. 20, 2017, provisional application No. 62/448,896, filed on Jan. 20, 2017, provisional application No. 62/448,899, filed on Jan. 20, 2017, provisional application No. 62/462,818, filed on Feb. 23, 2017.

(51) Int. Cl.
| | |
|---|---|
| *H04L 29/06* | (2006.01) |
| *H04L 9/30* | (2006.01) |
| *H04L 9/06* | (2006.01) |
| *G06F 16/33* | (2019.01) |
| *G06F 21/62* | (2013.01) |
| *G06F 16/25* | (2019.01) |
| *H04L 9/32* | (2006.01) |
| *G06F 40/30* | (2020.01) |
| *H04L 9/14* | (2006.01) |
| *G09C 1/00* | (2006.01) |
| *G06F 17/16* | (2006.01) |
| *H04L 9/08* | (2006.01) |
| *G06F 40/211* | (2020.01) |
| *G06F 40/253* | (2020.01) |
| *G06F 40/284* | (2020.01) |
| *G06F 40/295* | (2020.01) |
| *G06N 3/04* | (2006.01) |
| *G06N 3/08* | (2006.01) |
| *G06N 7/08* | (2006.01) |
| *G06F 21/30* | (2013.01) |

(52) U.S. Cl.
CPC .......... *G06F 17/16* (2013.01); *G06F 21/6218* (2013.01); *G06F 40/30* (2020.01); *G09C 1/00* (2013.01); *H04L 9/0643* (2013.01); *H04L 9/0861* (2013.01); *H04L 9/14* (2013.01); *H04L 9/30* (2013.01); *H04L 9/302* (2013.01); *H04L 9/3242* (2013.01); *H04L 63/0435* (2013.01); *G06F 21/30* (2013.01); *G06F 40/211* (2020.01); *G06F 40/253* (2020.01); *G06F 40/284* (2020.01); *G06F 40/295* (2020.01); *G06N 3/04* (2013.01); *G06N 3/08* (2013.01); *G06N 7/08* (2013.01); *H04L 2209/04* (2013.01); *H04L 2209/12* (2013.01)

(58) Field of Classification Search
CPC . H04L 63/0435; G06F 16/3344; G06F 17/16; G06F 17/2785; G09C 1/00
See application file for complete search history.

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 * | 7/2015 | Yung ...................... H04L 9/008 |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 10,873,568 B2 | 12/2020 | Williams |
| 10,880,275 B2 | 12/2020 | Williams |
| 10,902,133 B2 | 1/2021 | Williams et al. |
| 10,903,976 B2 | 1/2021 | Williams et al. |
| 10,972,251 B2 | 4/2021 | Carr |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |

(56) References Cited

U.S. PATENT DOCUMENTS

| | | |
|---|---|---|
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1* | 7/2013 | Balakrishnan .......... H04L 9/008 713/190 |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mori et al. |
| 2013/0326224 A1 | 12/2013 | Yavuz |
| 2013/0339722 A1* | 12/2013 | Krendelev ............ H04L 9/0637 713/150 |
| 2013/0339751 A1* | 12/2013 | Sun ..................... G06F 21/6254 713/189 |
| 2013/0346741 A1 | 12/2013 | Kim et al. |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1* | 12/2014 | Iwamura ................ H04L 9/008 380/30 |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1* | 8/2015 | Nita ....................... H04L 9/008 713/168 |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1* | 4/2016 | Soon-Shiong ...... H04L 63/0442 713/164 |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1* | 6/2016 | Rane ....................... H04L 9/008 713/168 |
| 2016/0323098 A1 | 11/2016 | Bathen |
| 2016/0335450 A1* | 11/2016 | Yoshino ................. G06F 16/35 |
| 2016/0344557 A1 | 11/2016 | Chabanne et al. |
| 2016/0350648 A1* | 12/2016 | Gilad-Bachrach ....... G06N 3/08 |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1* | 5/2017 | Pasol .................... H04L 9/3066 |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1* | 5/2018 | Chu ...................... H04L 9/3247 |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1* | 9/2018 | Sirdey .................. G06Q 10/047 |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0382274 A1 | 12/2020 | Williams et al. |
| 2020/0396053 A1 | 12/2020 | Williams et al. |
| 2021/0034765 A1 | 2/2021 | Williams et al. |
| 2021/0105256 A1 | 4/2021 | Williams |

FOREIGN PATENT DOCUMENTS

| | | |
|---|---|---|
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013 pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

(56) References Cited

OTHER PUBLICATIONS

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "GAZELLE: A Low Latency Framework for Secure Neural Network Inference", 27th USENIX Security Symposium, Aug. 15-17, 2018. pp. 1650-1668.

Viejo et al., "Asymmetric homomorphisms for secure aggregation in heterogeneous scenarios," Information Fusion 13, Elsevier B.V., Mar. 21, 2011, pp. 285-295.

Patil et al., "Big Data Privacy Using Fully Homomorphic Non-Deterministic Encryption," IEEE 7th International Advance Computing Conference, Jan. 5-7, 2017, 15 pages.

Williams, Ellison Anne et al., "WIDESKIES: Scalable Private Information Retrieval," Jun. 8, 2016, 14 pages.

Bösch et al.,"SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Panda et al., "FPGA Prototype of Low Latency BBS PRNG," IEEE International Symposium on Nanoelectronic and Information Systems, Dec. 2015, pp. 118-123, 7 pages.

Sahu et al., "Implementation of Modular Multiplication for RSA Algorithm," 2011 International Conference on Communication Systems and Network Technologies, 2011, pp. 112-114, 3 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

PIRK Code Excerpt—QuerierDriver, https://github.com/apache/incubator-retired-pirk/blob/master/src/main/java/org/apache/pirk/querier/wideskies/QuerierDriver.java; Jul. 11, 2016; 5 pages.

PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.

PIRK Code Excerpt—Query; [online]; Retreived from the Internet: <URL: https://github.com/apache/incubator-retired-pirk/blob/master/src/main/java/org/apache/pirk/query/wideskies/Query.java>; Jul. 11, 2016; 7 pages.

PIRK Code Excerpt—Queryinfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.

PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java> Jul. 11, 2016; 8 pages.

PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.

PIRK Code Excerpt—HashSelectorsAndFormPartitionsBigInteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.

PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.

PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.

"PIRK Proposal" Apache.org [online], [retreived on Oct. 28, 2020]; Retreived from the Internet: <URL:https://cwiki.apache.org/confluence/display/incubator/PirkProposal>; Apr. 10, 2019; 5 pages.

\* cited by examiner

END-TO-END SECURE OPERATIONS FROM A NATURAL LANGUAGE EXPRESSION

CROSS REFERENCE TO RELATED APPLICATIONS

This application claims the benefit of U.S. Provisional Application No. 62/448,890, filed on Jan. 20, 2017; U.S. Provisional Application No. 62/448,918, filed on Jan. 20, 2017; United States Provisional Application No. 62/448,893, filed on Jan. 20, 2017; U.S. Provisional Application No. 62/448,906, filed on Jan. 20, 2017; U.S. Provisional Application No. 62/448,908, filed on Jan. 20, 2017; United States Provisional Application No. 62/448,913, filed on Jan. 20, 2017; U.S. Provisional Application No. 62/448,916, filed on Jan. 20, 2017; U.S. Provisional Application No. 62/448,883, filed on Jan. 20, 2017; United States Provisional Application No. 62/448,885, filed on Jan. 20, 2017; U.S. Provisional Application No. 62/448,902, filed on Jan. 20, 2017; U.S. Provisional Application No. 62/448,896, filed on Jan. 20, 2017; U.S. Provisional Application No. 62/448,899, filed on Jan. 20, 2017; and U.S. Provisional Application No. 62/462,818, filed on Feb. 23, 2017, all the disclosures of which are hereby incorporated by reference.

TECHNICAL FIELD

The present technology relates generally to encryption, and more specifically to homomorphic encryption.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Encryption is the process of encoding a message or information in such a way that only authorized parties can access it and those who are not authorized cannot. Encryption does not by itself prevent interference, but denies the intelligible content to a would-be interceptor. In an encryption scheme, the intended information or message, referred to as plaintext, is encrypted using an encryption algorithm, referred to as a cipher, generating ciphertext that can only be read if decrypted. A cryptosystem is pair (encryption and decryption) of algorithms that take a key and convert plaintext to ciphertext and back.

Encryption is used by militaries and governments to facilitate secret communication. It is also used to protect information within civilian systems. Encryption can be used to protect data "at rest," such as information stored on computers and storage devices. Encryption is also used to protect data in transit, for example, data being transferred via networks (e.g., the Internet, e-commerce), mobile telephones, Bluetooth devices and bank automatic teller machines (ATMs).

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for an end-to-end secure operation from an expression in natural language. Specifically, a method may comprise: receiving a set of queries from a natural language processor, the set of queries being produced by a method including: getting data schemas associated with a target data source; obtaining the expression in natural language; performing natural language processing on the expression to determine a desired operation; and generating the set of queries using at least one of matching and inference techniques over the desired operation with respect to the data schemas; encrypting the set of queries using a homomorphic encryption technique; providing the encrypted set of queries to a server, the server including the target data source; acquiring encrypted results, the encrypted results being responsive to the encrypted set of queries; and decrypting the encrypted results using a decryption key to produce desired results.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
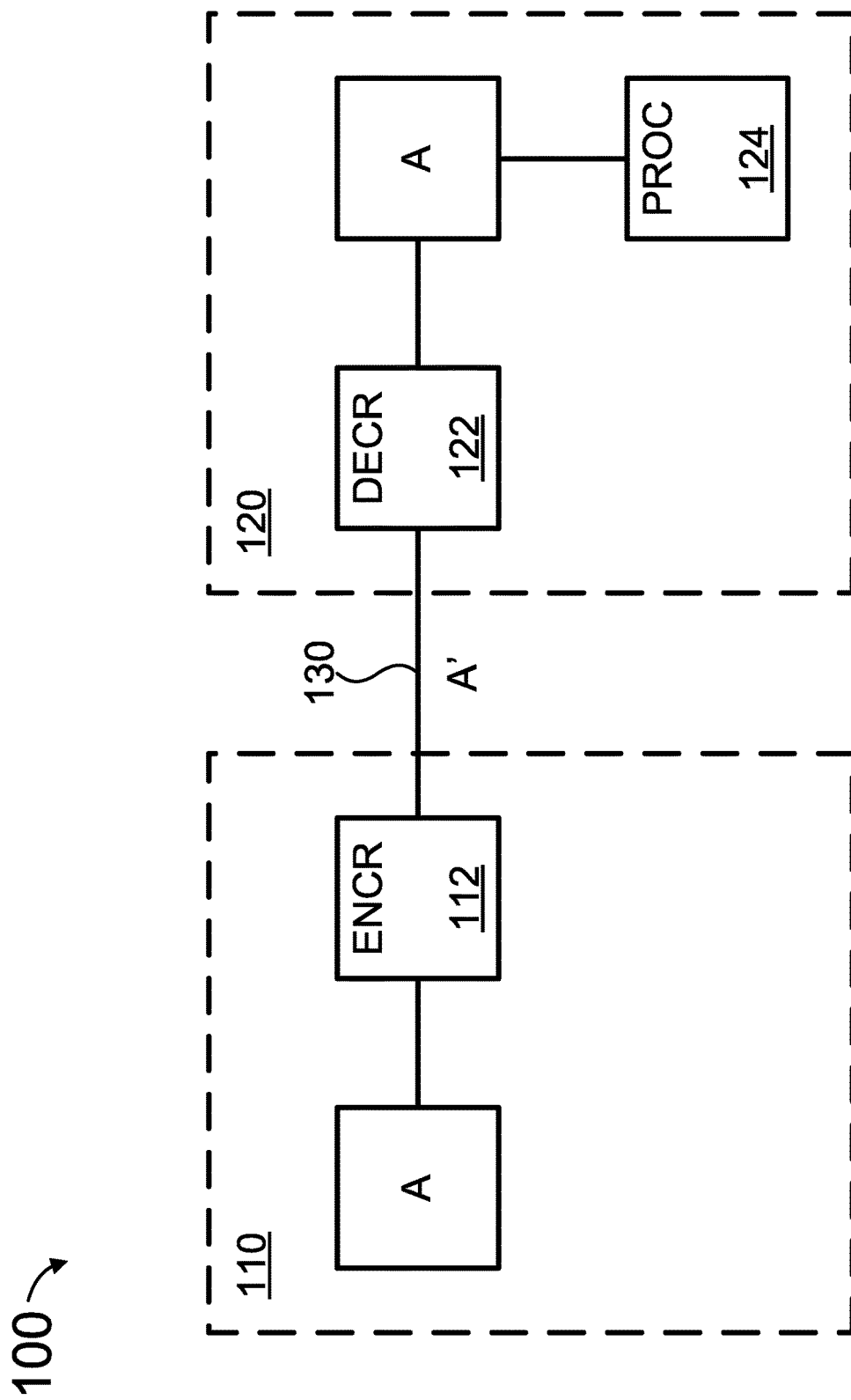
FIG. 1 is a simplified representation of a system for encryption, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 illustrates system 100 for encryption, according to some embodiments. System 100 can include source system 110, destination system 120, and communications link 130. Source system 110 and destination system 120 can include at least some of the characteristics of computing systems described further in relation to FIG. 5. Source system 110 can include encryption engine 112. Destination system 120 can include decryption engine 122 and process 124. Encryption engine 112, decryption engine 122, and/or process 124 can include any of an application-specific integrated circuit (ASIC), field programmable gate array (FPGA), application-specific standard product (ASSP), an electronic circuit, a processor (shared, dedicated, or group) that executes one or more software or firmware programs, a combinational logic circuit, and/or other suitable components that provide the described functionality.

Encryption engine 112 can encrypt plaintext A to ciphertext A' using an encryption algorithm and an encryption key. Decryption engine 122 can decrypt ciphertext A' to plaintext A using the encryption algorithm and a decryption key.

In symmetric-key encryption schemes, the encryption and decryption keys are the same. In symmetric-key encryption schemes, source system 110 and destination system 120 should have the same key in order to achieve secure communication over communications link 130. Examples of symmetric-key encryption schemes include: Twofish, Serpent, AES (Rijndael), Blowfish, CAST5, Kuznyechik, RC4, 3DES, Skipjack, Safer+/++ (Bluetooth), and IDEA.

In public-key encryption schemes, the encryption key (public key) is published for anyone (e.g., source system 110) to use and encrypt messages. However, only the receiving party (e.g., destination system 120) has access to the decryption key (private key) that enables messages to be read. Examples of public-key encryption schemes include: RSA, ElGamal, Elliptic Curve Cryptography (ECC), and Cramer-Shoup.

Process 124 can be any operation performed (or application which works) on information (e.g., plaintext A). For example, process 124 can be a database search, Internet search, financial transaction, ecommerce transaction, word processing application, spreadsheet application, and the like.

Although depicted as separate systems, source system 110 and destination system 120 can be a single system where ciphertext (encrypted or encoded information) is created, stored, and (subsequently) converted back to plaintext (readable information). Communications link 130 can be various combinations and permutations of wired and wireless networks (e.g., Ethernet, Wi-Fi, Bluetooth, mobile broadband, the Internet, etc.), internal/external computer busses, and the like, such as described in relation to FIG. 5.

Figure 2:
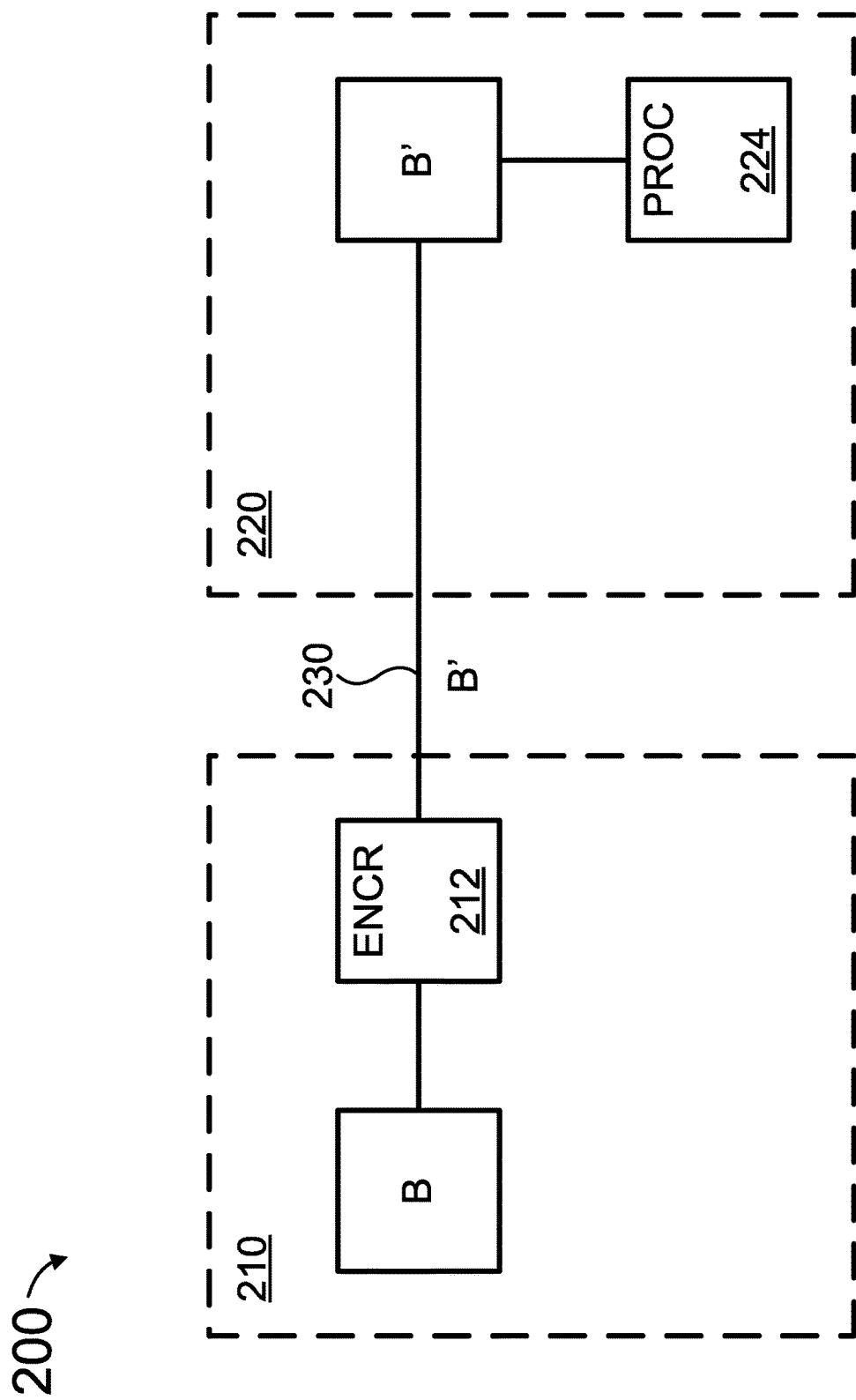
FIG. 2 is a simplified representation of a system for homomorphic encryption, according to various embodiments.

FIG. 2 shows system 200 for homomorphic encryption, according to various embodiments. System 200 can include source system 210, destination system 220, and communications link 230. Source system 210 and destination system 220 can include at least some of the characteristics of computing systems described further in relation to FIG. 5. Source system 210 can include encryption engine 212. Destination system 220 can include process 224. Encryption engine 212 and/or process 224 can include any of an application-specific integrated circuit (ASIC), field programmable gate array (FPGA), application-specific standard product (ASSP), an electronic circuit, a processor (shared, dedicated, or group) that executes one or more software or firmware programs, a combinational logic circuit, and/or other suitable components that provide the described functionality.

Encryption engine 212 can encrypt plaintext B to ciphertext B' using a homomorphic encryption algorithm and an encryption key. Homomorphic encryption is a form of encryption in which a certain algebraic operation (generally referred to as addition or multiplication) performed on plaintext is equivalent to another operation performed on ciphertext. Homomorphic encryption algorithms can be partially homomorphic (exhibits either additive or multiplicative homomorphism, or an unlimited number addition or multiplication operations and a limited number of multiplication or addition operations) or fully homomorphic (exhibits both additive and multiplicative homomorphism). For example, in partially homomorphic encryption schemes, multiplication in ciphertext is equal to addition of the same values in plaintext.

Examples of partially homomorphic cryptosystems include: RSA (multiplicative homomorphism), ElGamal (multiplicative homomorphism), and Paillier (additive homomorphism). Other partially homomorphic cryptosystems include the Okamoto-Uchiyama, Naccache-Stern, Damgård-Jurik, Sander-Young-Yung, Boneh-Goh-Nissim, and Ishai-Paskin cryptosystems. Examples of fully homomorphic cryptosystems include: the Brakerski-Gentry-Vaikuntanathan, Brakerski's scale-invariant, NTRU-based, and Gentry-Sahai-Waters (GSW) cryptosystems.

Process 224 can be an operation performed (or application which works) on homomorphically encrypted information (e.g., ciphertext B') such that decrypting the result of the operation is the same as the result of some operation performed on the corresponding plaintext (e.g., plaintext B). For example, a homomorphically encrypted Internet search engine receives encrypted search terms and compare them with an encrypted index of the web. By way of further non-limiting example, a homomorphically encrypted financial database stored in the cloud allows users to ask how much money an employee earned in a particular time period. However, it would accept an encrypted employee name and output an encrypted answer, avoiding the privacy problems that can plague online services that deal with such sensitive data.

Figure 5:
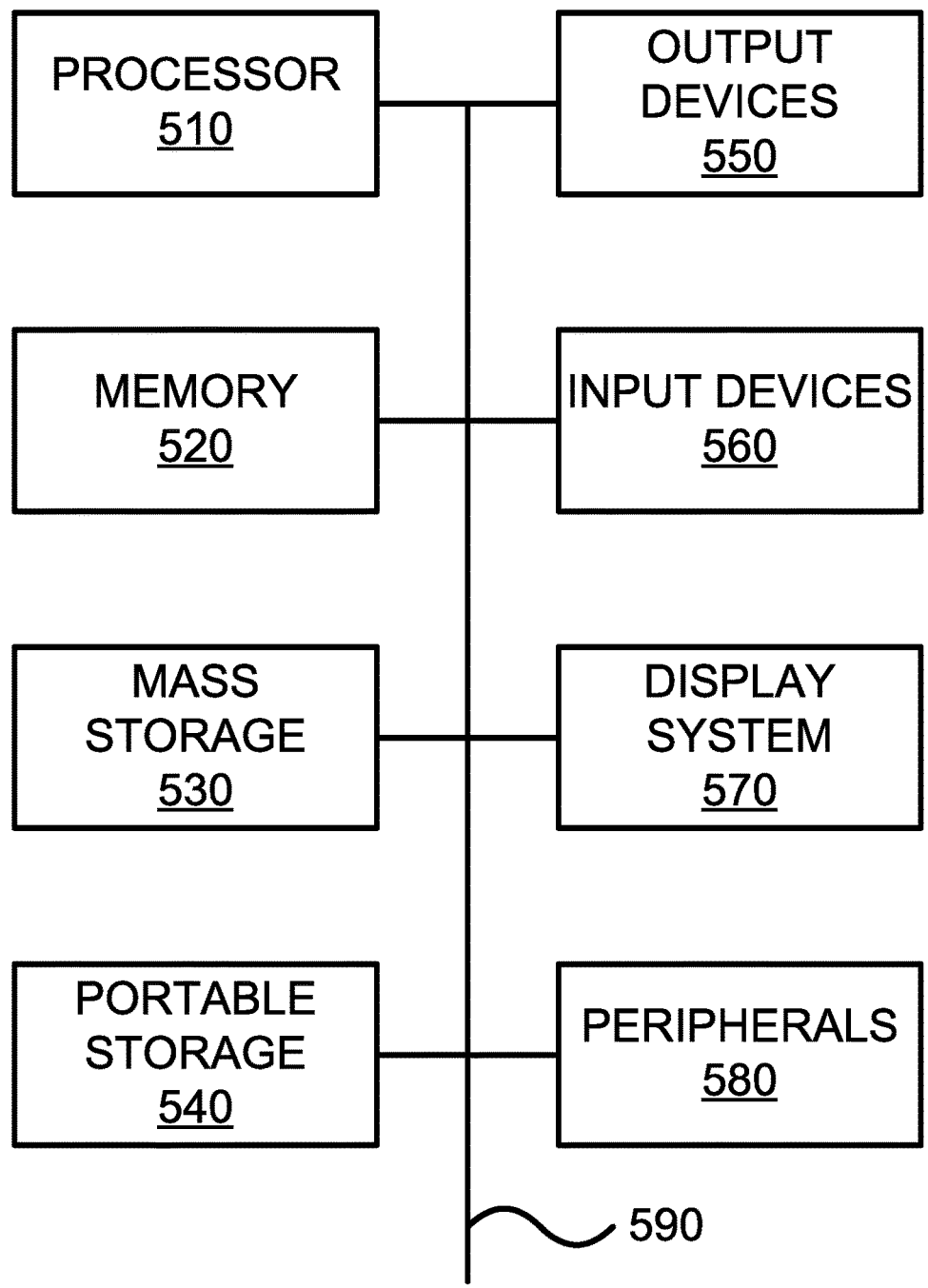
FIG. 5 is a simplified block diagram of a computing system, according to some embodiments.

Communications link 230 can be various combinations and permutations of wired and wireless networks (e.g., Ethernet, Wi-Fi, Bluetooth, mobile broadband, the Internet, etc.), internal/external computer busses, and the like, such as described in relation to FIG. 5.

Figure 3:
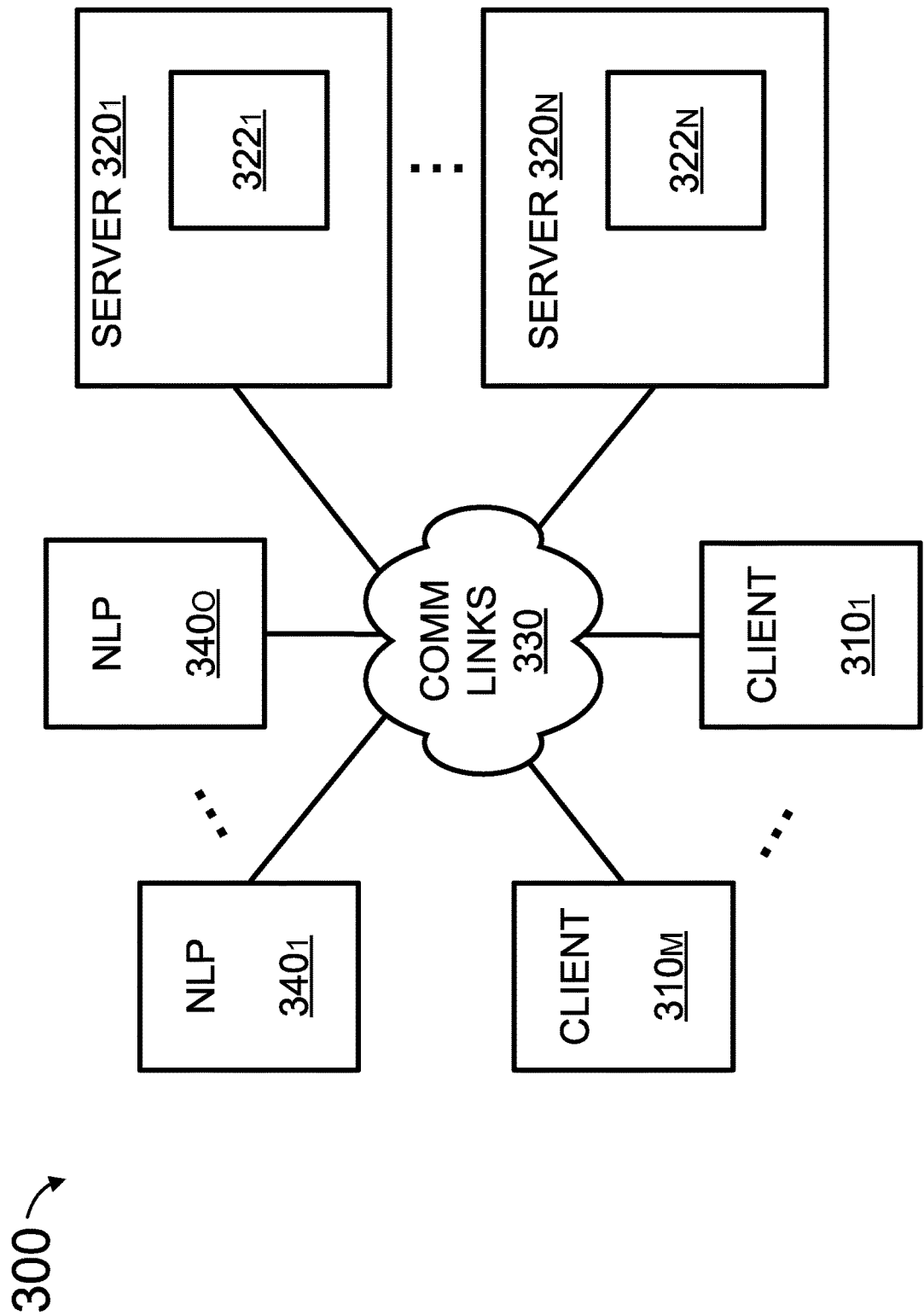
FIG. 3 is a simplified block diagram of a system for end-to-end secure operations from a natural language expression, in accordance with some embodiments.

FIG. 3 depicts system 300 for end-to-end secure operations from a natural language statement, in accordance with some embodiments. System 300 can include one or more clients $310_1$-$310_M$, one or more servers $320_1$-$320_N$, communications links 330, and one or more natural language processors $340_1$-$340_O$. One or more clients $310_1$-$310_M$, one or more servers $320_1$-$320_N$, and one or more natural language processors $340_1$-$340_O$ can each be disposed in same and/or different locations (e.g., offices, data centers, cities, counties, geographic regions, countries, continents, etc.). Additionally or alternatively, one or more clients $310_1$-$310_M$, one or more servers $320_1$-$320_N$, and one or more natural language processors $340_1$-$340_O$ can each be in varied computing environments, including shared computing architectures, hybrid architectures, distinct architectures (e.g., cloud computing environments), and combinations thereof. One or more clients $310_1$-$310_M$, one or more servers $320_1$-$320_N$, and one or more natural language processors $340_1$-$340_O$ can each include any of an application-specific integrated circuit (ASIC), field programmable gate array (FPGA), application-specific standard product (ASSP), an electronic circuit, a processor (shared, dedicated, or group)

that executes one or more software or firmware programs, a combinational logic circuit, and/or other suitable components that provide the described functionality. Additionally or alternatively, one or more clients $310_1$-$310_M$, one or more servers $320_1$-$320_N$, and one or more natural language processors $340_1$-$340_O$ can include at least some of the characteristics of computing systems described further in relation to FIG. 5.

A target data source may be in a single server or distributed over multiple servers of one or more servers $320_1$-$320_N$ as target data source $322_1$-$322_N$. Target data source $322_1$-$322_N$ can be unencrypted (in plaintext form), deterministically encrypted (e.g., RSA), semantically encrypted (e.g., AES), and combinations thereof. When target data source $322_1$-$322_N$ is a combination of encrypted and unencrypted fields, each field can be consistently encrypted or unencrypted. For example, when target data source $322_1$-$322_N$ includes an unencrypted "employee name" field, the employees names are all unencrypted, as opposed to some name names being encrypted and others unencrypted. By way of further non-limiting example, when target data source $322_1$-$322_N$ includes an encrypted "social security number" field, the social security numbers are all encrypted, as opposed to some social security numbers being encrypted and others unencrypted. Data stored in and/or retrieved from target data source $322_1$-$322_N$ can be encrypted and/or decrypted as described in relation to FIG. 1.

One or more natural language processors $340_1$-$340_O$ perform (speaker dependent and/or speaker independent) automatic speech recognition (ASR), computer speech recognition, speech to text (STT), and the like, according to some embodiments. For example, one or more natural language processors $340_1$-$340_O$ receive spoken/audible natural (human) language (speech/statement/expression) (e.g., using a transducer such as a microphone, analog-to-digital converter, digital signal processor, etc.), recognize the speech/statement/expression, translate the speech/statement/expression into text. A natural language expression can be one or more words conveying a desired operation (e.g., query or analytic). Additionally or alternatively one or more natural language processors $340_1$-$340_O$ convert the translated text into a desired operation (e.g., query or analytic).

In some embodiments, one or more natural language processors $340_1$-$340_O$ identify boundaries between words, syllables, or phonemes in spoken natural languages, referred to as speech segmentation. For example, one or more natural language processors $340_1$-$340_O$ understand a complex spoken sentence by decomposing it into smaller lexical segments (approximately, the words of the language), associating a meaning to each segment, and combining those meanings according to the grammar rules of the language, referred to as lexical recognition. By way of further non-limiting example, one or more natural language processors $340_1$-$340_O$ use phonotactic cues to identify boundaries between lexical units. Phonotactic cues can be restrictions in a language based on the permissible combinations of phonemes, such as permissible syllable structure, consonant clusters and vowel sequences. In various embodiments, one or more natural language processors $340_1$-$340_O$ use acoustic modeling and/or language modeling, such as Hidden Markov Models (HMM), dynamic time warping (DTW), neural networks, deep learning (deep feedforward neural network (DNN)), "end-to-end" ASR, and the like.

Additionally or alternatively, one or more natural language processors $340_1$-$340_O$ can process a request for an operation (e.g., query or analytic) in a natural (human) language expression, according to some embodiments. A natural language expression can be one or more words conveying a desired operation (e.g., query or analytic). For example, one or more natural language processors $340_1$-$340_O$ can receive a natural (human) language expression in text (e.g., received using a physical keyboard, virtual keyboard, etc.), and convert the text expression into a desired operation (e.g., query or analytic).

In various embodiments, one or more natural language processors $340_1$-$340_O$ process (e.g., analyze syntax, semantics, and the like) a received natural (human) language expression. For example, one or more natural language processors $340_1$-$340_O$ perform at least one of lemmatization (e.g., identifying the intended part of speech and meaning of a word in a sentence and within the larger context surrounding that sentence), part of speech tagging (e.g., determining the part of speech for each word), parsing (e.g., determining a parse tree (grammatical analysis) of a sentence) such as Dependency Parsing and Constituency Parsing, sentence breaking (e.g., finding sentence boundaries), stemming (e.g., reducing inflected or derived words to their word stem, base or root form), word segmentation (e.g., separate continuous text into separate words), terminology extraction (e.g., extract relevant terms from a corpus), and the like.

By way of further non-limiting example, one or more natural language processors $340_1$-$340_O$ perform at least one of lexical semantics (e.g., determining a computational meaning of individual words in context), named entity recognition (NER; e.g., determining which items in the text map to proper names and what a type for each proper name), natural language understanding (e.g., identifying an intended semantic from multiple possible semantics in the form of organized notations of natural languages concepts), word-sense disambiguation (WSD; e.g., identifying which sense of a word (meaning) is used in an expression), and the like. By way of further non-limiting example, optical character recognition (OCR) can be performed on a representation of a (e.g., image or other electronic/digital form of written/printed) natural language expression (e.g., received using a camera, scanner, and the like). By way of further non-limiting example, one or more natural language processors $340_1$-$340_O$ can apply machine learning techniques to natural language processing tasks. The operations of one or more natural language processors $340_1$-$340_O$, such as described above, may be collectively referred to as natural language processing.

Communications links 330 can be various combinations and permutations of wired and wireless networks (e.g., Ethernet, Wi-Fi, Bluetooth, mobile broadband, the Internet, etc.), internal/external computer busses, and the like, such as described in relation to FIG. 5. Although depicted as a single "block," communications links 330 can be, for example, multiple distinct/separate combinations and permutations of wired and wireless networks, internal/external computer busses, and the like. For example, one or more natural language processors $340_1$-$340_O$ are each integrated with a client of the one of one or more clients $310_1$-$310_M$ and communicate over a computer bus. By way of further non-limiting example, one or more natural language processors $340_1$-$340_O$ are separate from one or more natural language processors $340_1$-$340_O$ and communicate over a wired network (e.g., LAN).

In some embodiments, system 300 encrypts a desired operation (e.g., query or analytic) to be executed over target data source $322_1$-$322_N$ using a homomorphic encryption scheme, such as described in relation to FIG. 2. For example, system 300 (e.g., one or more clients $310_1$-$310_M$) encrypts the desired query as a set of homomorphic queries Q_E. The homomorphic queries Q_E is encrypted and the desired query should not be recoverable without a private key. Since one or more servers $320_1$-$320_N$ do not decrypt the desired query or the encrypted results E(R), one or more servers $320_1$-$320_N$ do not have the private key. The homomorphic queries Q_E provides a secure and (completely) encrypted way to perform a query. In contrast, traditional methods of performing queries over data sources require decryption of the query.

Figure 4:
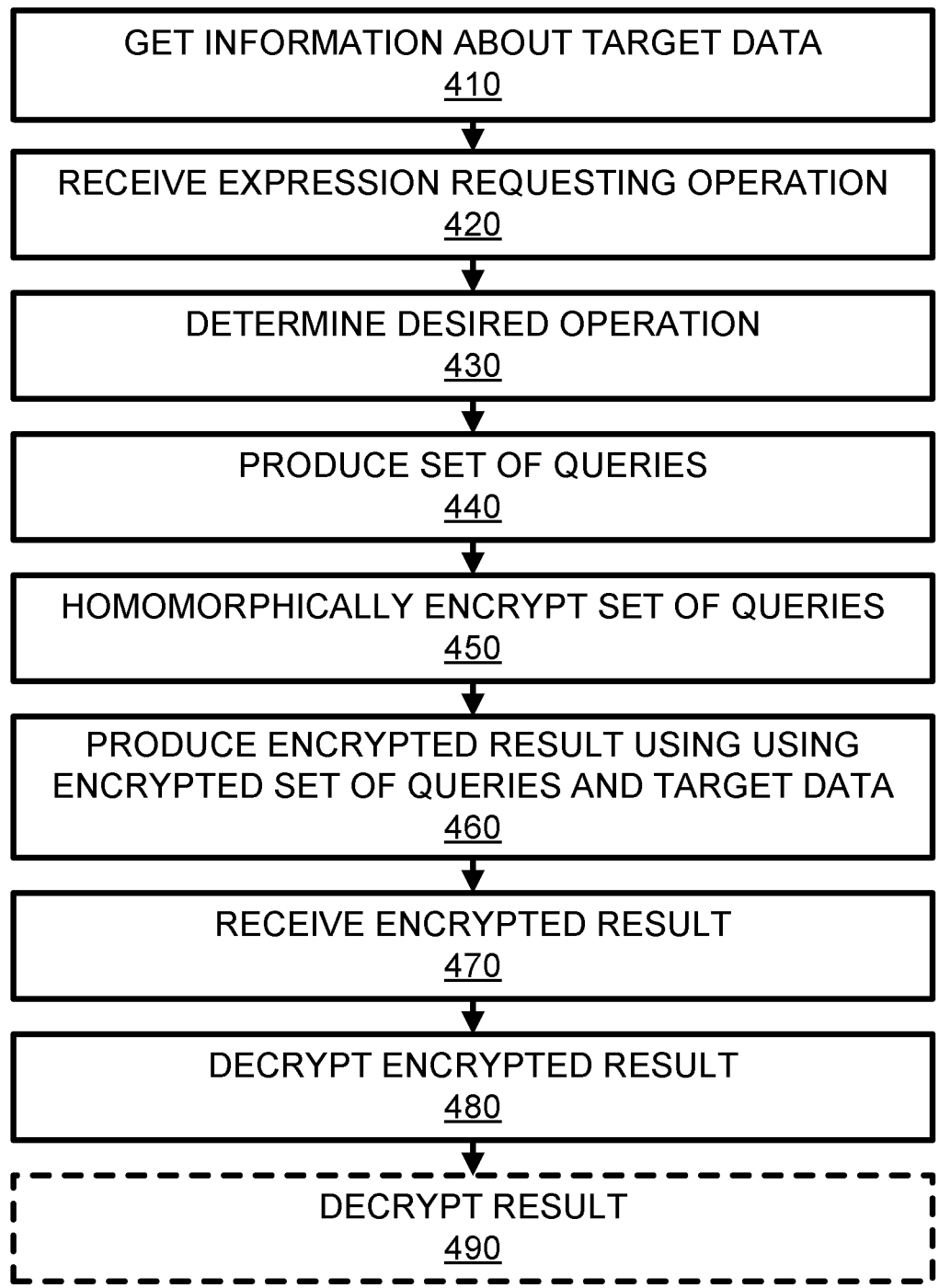
FIG. 4 is a flow diagram of a method for end-to-end secure queries from speech, in accordance with various embodiments.

FIG. 4 illustrates a method 400 for end-to-end secure queries from speech, in accordance with various embodiments. System 300 (FIG. 3) can perform method 400. At step 410, one or more natural language processors $340_1$-$340_O$ can receive information about target data source $322_1$-$322_N$ from one or more servers $320_1$-$320_N$. In some embodiments, a natural language processor of one or more natural language processors $340_1$-$340_O$ can receives data schemas D_S associated with data in target data source $322_1$-$322_N$. Data schemas D_S can be the structure of a database. For example, the information can include a number of records, fields in each record (e.g., name, telephone number, social security number, etc.,), and the like in target data source $322_1$-$322_N$. By way of further non-limiting example, the information can denote whether target data source $322_1$-$322_N$ is unencrypted, encrypted, and combinations thereof. When a part of target data source $322_1$-$322_N$ is encrypted, a client of one or more clients $310_1$-$310_M$ can receive a decryption key—associated with the encryption method used to encrypt the part of target data source $322_1$-$322_N$—to decrypt returned encrypted data.

At step 420, a natural (human) language expression including a request for a desired operation (desired query or analytic) can be received. The natural (human) language expression can be audible human speech, text, an image, and the like in a digital form. For example, the natural language request is received using a transducer (e.g., microphone), analog-to-digital-converter, a digital signal processor, and the like. By way of further non-limiting example, the natural language request is received using a physical keyboard, virtual keyboard, camera, scanner, and the like. In some embodiments, step 420 is performed by one or more natural language processors $340_1$-$340_O$.

At step 430, a desired operation U can be determined using the natural language expression. For example, automatic speech recognition (ASR) is performed on the (spoken) natural language expression to determine the desired operation U (desired query or analytic). By way of further non-limiting example, natural language processing is performed on the (text) natural language expression to determine the desired operation U (desired query or analytic). In some embodiments, step 430 is performed by one or more natural language processors $340_1$-$340_O$.

At step 440, a set of queries Q can be produced using the desired operation U and the received information. For example, the set of queries Q is produced using matching and inference techniques over the desired operation U with respect to data schemas D_S. Queries Q={Q_i} can contain terms and expressions valid within data schemas D_S that satisfy the desired operation U. In some embodiments, step 440 is performed by one or more natural language processors $340_1$-$340_O$.

At step 450, queries Q are encoded as a set of homomorphic queries Q_E using a homomorphic encryption scheme H. Homomorphic queries Q_E are encrypted and queries Q should not be recoverable from homomorphic queries Q_E without a private key associated with homomorphic encryption scheme H. In some embodiments, step 450 is performed by one or more clients $310_1$-$310_M$.

At step 460, using techniques of the homomorphic encryption scheme H, one or more servers $320_1$-$320_N$ can evaluate homomorphic queries Q_E over target data source $322_1$-$322_N$ and produce encrypted results E(R). At step 470, encrypted results E(R) can be provided by one or more servers $320_1$-$320_N$ (FIG. 3) and received by one or more clients $310_1$-$310_M$.

At step 480, encrypted results E(R) can be decrypted using the private key associated with homomorphic queries Q_E. For example, a client of one or more clients $310_1$-$310_M$ can decrypt the encrypted results E(R). Optionally at step 490, the results R can be decrypted using another decryption key associated with the encryption method used to encrypt the underlying data in target data source $322_1$-$322_N$.

FIG. 5 depicts an exemplary computer system (or computing system) 500 that may be used to implement some embodiments of the present invention. The computer system 500 in FIG. 5 may be implemented in the contexts of the likes of computing systems, networks, servers, or combinations thereof. The computer system 500 in FIG. 5 includes processor unit(s) 510 and main memory 520. Main memory 520 stores, in part, instructions and data for execution by processor unit(s) 510. Main memory 520 stores the executable code when in operation, in this example. The computer system 500 in FIG. 5 further includes a mass data storage 530, portable storage device 540, output devices 550, user input devices 560, a graphics display system 570, and peripheral device(s) 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 in FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system.

The components provided in the computer system 500 in FIG. 5 are those typically found in computer systems that may be suitable for use with embodiments of the present disclosure and are intended to represent a broad category of such computer components that are well known in the art. Thus, the computer system 500 in FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 500 may be implemented as a cloud-based computing environment, such as a virtual machine and/or container operating within a computing cloud. In other embodiments, the computing system 500 may itself include a cloud-based computing environment, where the functionalities of the computing system 500 are executed in a distributed fashion. Thus, the computing system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer implemented method for an end-to-end secure operation from an expression in natural language, comprising:

receiving a set of queries from a natural language processor via a client, the set of queries being produced by a method including:
getting data schemas associated with a target data source;
obtaining the expression in the natural language;
performing natural language processing on the expression to determine a desired operation expressed in the natural language; and
generating the set of queries using at least one of matching and inference techniques over the desired operation with respect to the data schemas, the set of queries containing terms and expressions valid within the data schemas, the terms and expressions satisfying the desired operation, the set of queries being unencrypted;
encrypting the set of queries, via the client, using a homomorphic encryption technique;
providing the encrypted set of queries from the client to a server, the server including the target data source;
acquiring encrypted results provided by the server and received by the client, the encrypted results being responsive to the encrypted set of queries; and
decrypting the encrypted results by the client, using a decryption key to produce desired results.

2. The method of claim 1, wherein the encrypted results are produced by a process including evaluating the encrypted set of queries over the target data source.

3. The method of claim 1, wherein the natural language processing uses at least one of speech segmentation, lexical recognition, phonotactic cues, lemmatization, part of speech tagging, parsing, sentence breaking, stemming, and word segmentation.

4. The method of claim 1, wherein the natural language processing uses at least one of Hidden Markov Models (HMM), dynamic time warping (DTW), neural networks, deep feedforward neural network (DNN), and "end-to-end" automatic speech recognition.

5. The method of claim 1, wherein the desired operation is at least one of a query and an analytic.

6. The method of claim 1, wherein the target data source is at least one of: unencrypted, deterministically encrypted, and semantically encrypted.

7. The method of claim 1, further comprising:
decrypting the desired results using another key when the target data source is encrypted, the other key being associated with an encryption method used to encrypt the target data source.

8. The method of claim 1, wherein the homomorphic encryption technique is partially homomorphic.

9. The method of claim 1, wherein the homomorphic encryption technique is fully homomorphic.

10. The method of claim 1, wherein the natural language processor and server each comprise multiple instances of one or more of a hardware sever, virtual machine, and container, each instance of the multiple instances including a subset of the target data source.

11. A system for an end-to-end secure operation from an expression in natural language, comprising:
a natural language processor:
getting data schemas associated with a target data source;
obtaining the expression in natural language;
performing natural language processing on the expression to determine a desired operation expressed in the natural language; and generating a set of queries using at least one of matching and inference techniques over the desired operation with respect to the data schemas, the set of queries containing terms and expressions valid within the data schemas, the terms and expressions satisfying the desired operation, the set of queries being unencrypted;

a client:
receiving the set of queries from the natural language processor;
encrypting the set of queries using a homomorphic encryption technique;
providing the encrypted set of queries to a server, the server including the target data source;
acquiring encrypted results, the encrypted results being responsive to the encrypted set of queries; and
decrypting the encrypted results using a decryption key to produce desired results; and the server:
evaluating the encrypted set of queries over the target data source to produce the encrypted results.

12. The system of claim 11, wherein the natural language processing uses at least one of speech segmentation, lexical recognition, phonotactic cues, lemmatization, part of speech tagging, parsing, sentence breaking, stemming, and word segmentation.

13. The system of claim 11, wherein the natural language processing uses at least one of Hidden Markov Models (HMM), dynamic time warping (DTW), neural networks, deep feedforward neural network (DNN), and "end-to-end" automatic speech recognition.

14. The system of claim 11, wherein the desired operation is at least one of a query and an analytic.

15. The system of claim 11, wherein the target data source is at least one of: unencrypted, deterministically encrypted, and semantically encrypted.

16. The system of claim 11, further comprising:
decrypting result R using another key when the target data source is encrypted, the other key being associated with an encryption method used to encrypt the target data source.

17. The system of claim 11, wherein the homomorphic encryption technique is partially homomorphic.

18. The system of claim 11, wherein the homomorphic encryption technique is fully homomorphic.

19. The system of claim 11, wherein the natural language processor and server each comprise multiple instances of one or more of a hardware sever, virtual machine, and container, each instance of the multiple instances including a subset of the target data source.

20. A system for an end-to-end secure operation from an expression in natural language comprising:
means for receiving a set of queries from a natural language processor, the set of queries being produced by a method including:
getting data schemas associated with a target data source;
obtaining the expression in the natural language;
performing natural language processing on the expression to determine a desired operation expressed in the natural language; and
generating a set of queries using at least one of matching and inference techniques over the desired operation with respect to the data schemas, the set of queries containing terms and expressions valid within the data schemas, the terms and expressions satisfying the desired operation, the set of queries being unencrypted;
means for encrypting the set of queries using a homomorphic encryption technique;
means for providing the encrypted set of queries to a server, the server including the target data source;
means for acquiring encrypted results, the encrypted results being responsive to the encrypted set of queries; and
means for decrypting the encrypted results by a client using a decryption key to produce desired results.

* * * * *